Jan. 8, 1935.  F. S. KINGSTON  1,987,194
CLUTCH
Filed June 4, 1932  3 Sheets-Sheet 1

INVENTOR
Frederick S. Kingston
BY Evans & McCoy
ATTORNEYS

Jan. 8, 1935.  F. S. KINGSTON  1,987,194
CLUTCH
Filed June 4, 1932  3 Sheets-Sheet 2

INVENTOR
Frederick S. Kingston
BY Evans & McCoy
ATTORNEYS

Jan. 8, 1935. F. S. KINGSTON 1,987,194
CLUTCH
Filed June 4, 1932 3 Sheets-Sheet 3

INVENTOR
Frederick S. Kingston
BY Evans & McCoy
ATTORNEYS

Patented Jan. 8, 1935

1,987,194

UNITED STATES PATENT OFFICE 1,987,194

CLUTCH

Frederick S. Kingston, Warren, Ohio, assignor, by mesne assignments, to General Motors Corporation, Detroit, Mich., a corporation of Delaware Application June 4, 1932, Serial No. 615,391

5 Claims. (Cl. 192—66)

This invention relates to friction clutches of the type in which a driving connection is established by engagement of axially separable clutch elements provided with conical engaging surfaces, one external and the other internal.

The clutch of the present invention is of quite general application but it is particularly suitable for use in electric motors to provide a releasable driving connection between the armature of the motor and the motor shaft.

The present invention has for an object to provide a clutch in which the interengaging clutch elements have an effective frictional driving engagement in which a relatively light pressure on the movable clutch element is sufficient to maintain the driving engagement, and in which only a relatively small force is required to disengage the clutch element.

A further object of the invention is to provide an expansible internal clutch element which is provided with means for exerting a positive radial supporting thrust on the expansible engaging portion thereof while in clutching engagement, and for relieving the radial supporting thrust prior to axial disengaging movement of the clutch elements.

It is further the object of the invention to obtain the advantageous results above referred to in a clutch which has few parts, which is of simple and rugged construction and which can be manufactured at a low cost.

With the above and other objects in view the invention may be said to comprise the clutch as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of this specification, in which.

Figure 1:
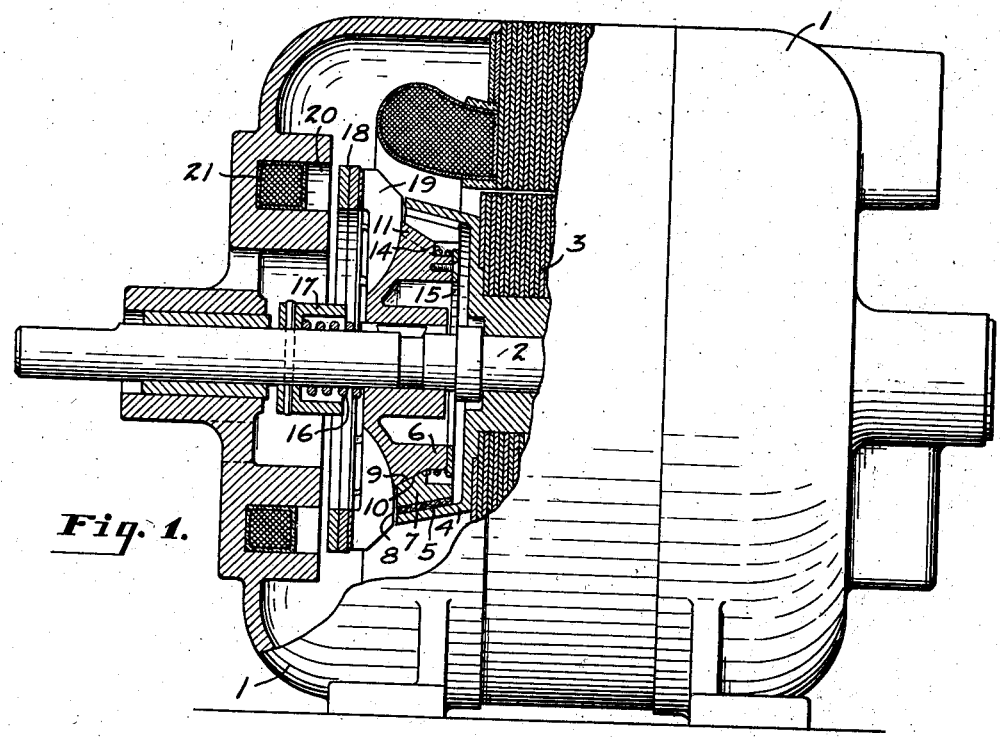
Fig. 1 is a sectional elevation showing the clutch applied to an electric motor.
Figure 2:
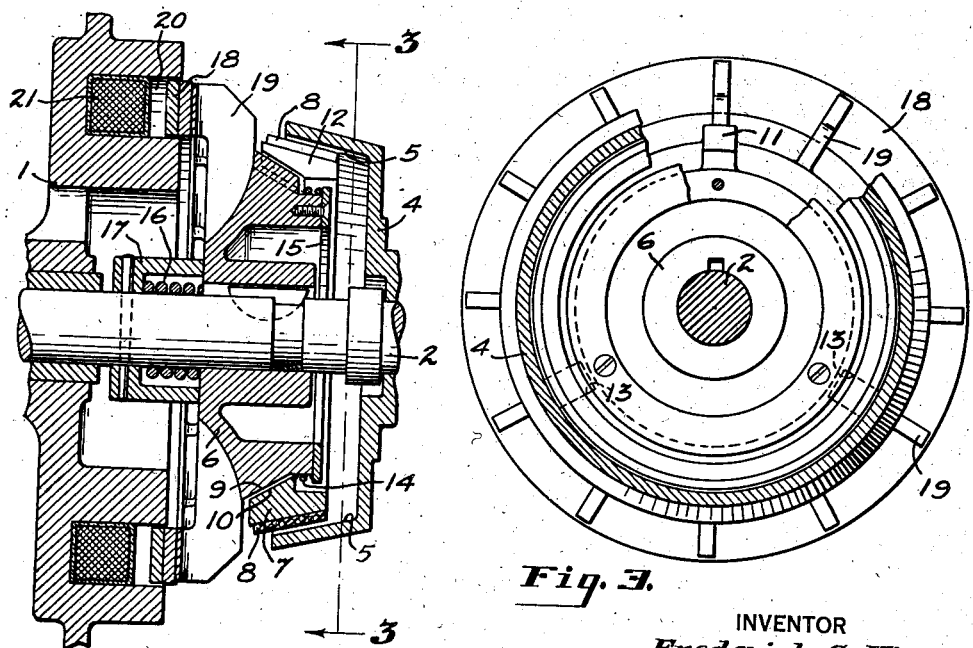
Fig. 2 is an axial section through the clutch showing the clutch elements disengaged.
Figure 3:
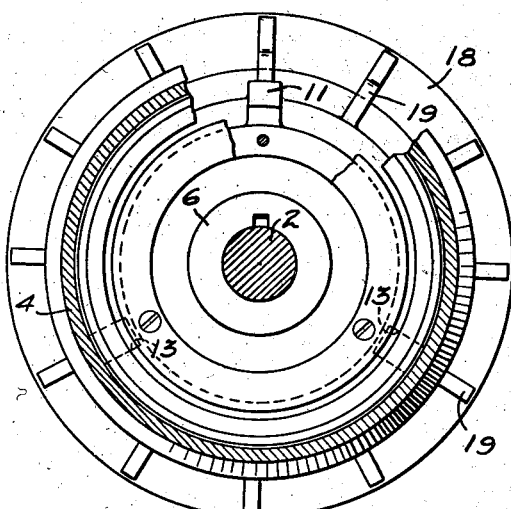
Fig. 3 is a section taken on the line indicated at 3—3 in Fig. 2.
Figure 4:
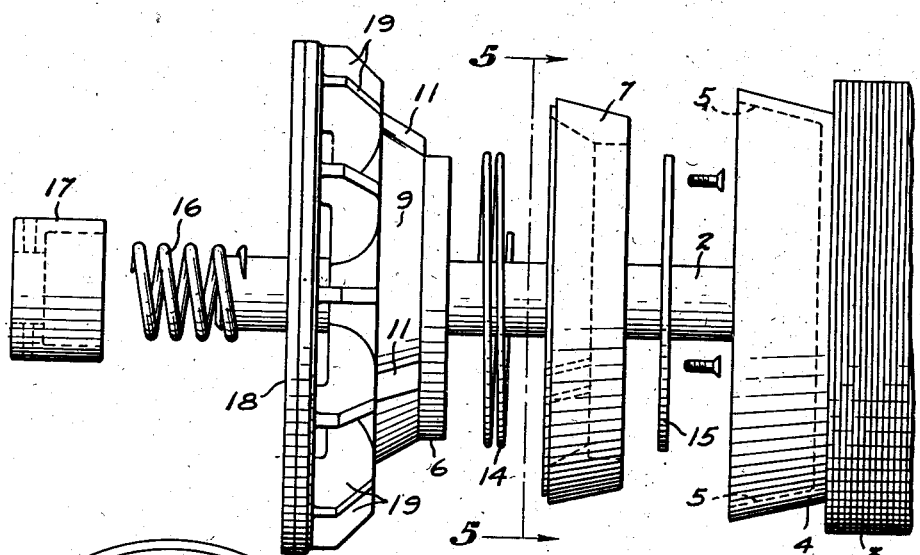
Fig. 4 is a side elevation showing the parts of the clutch separated.
Figure 5:
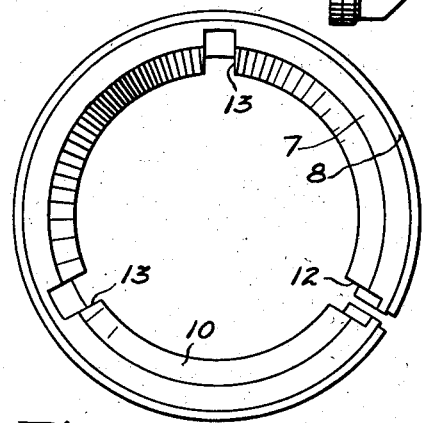
Fig. 5 is a front elevation of the expansible engaging ring viewed as indicated by the line 5—5 in Fig. 4.
Figure 6:
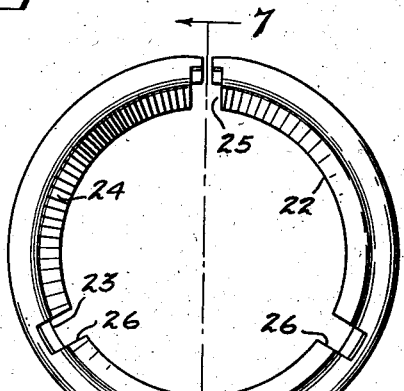
Fig. 6 is a front elevation of a modified form of engaging ring.

In the accompanying drawings the clutch of the present invention is illustrated as applied to an electric motor which is provided with the usual housing 1 in which the motor shaft 2 is centrally journalled. The motor has an armature 3 which is rotatably mounted upon the shaft 2 and held against axial movement on the shaft.

A clutch element 4 is fixed to one end of the armature sleeve and the face of this clutch element is recessed to provide an internal conical engaging face 5 of relatively small angle to obtain positive driving engagement between the clutch members. The movable element of the clutch comprises a hub member 6 splined on the shaft 2 and movable axially toward and away from the clutch element 4, the hub member 6 having mounted thereon a peripheral engaging ring 7 which is connected to the hub for rotation therewith but which is yieldingly contractible radially and provided with an external conical face for engagement with the internal conical surface 5 of the clutch element 4 which has a taper corresponding to that of the internal conical surface 5, a band of friction material 8 being secured to the periphery of the ring 7. The interengaging conical faces of the clutch element 4 and ring 7 are tapered at a relatively small angle and the hub member 6 and ring 7 have interengaging conical faces 9 and 10 which taper in the same direction as the conical surface 5 but at a greater angle for ease in separating the clutch elements. Relative rotation between the hub member 6 and ring 7 is prevented by means of radial lugs 11 on the hub 6 which engage in recesses on the interior of the ring. The ring 7 is a transversely split ring and the ring has one of its lug receiving recesses 12 located at the split to locate one of the driving lugs between the separable ends of the ring and one or more lug receiving recesses 13 are provided in portions of the ring opposite the split, the recesses 13 being formed to provide sufficient clearance between the lugs and recesses to permit the ring to expand or contract freely intermediate its ends. By locating a lug engaging recess at the point where the ring is split and spacing the other recesses of the ring at a considerable distance from the split the ends of the ring are free to spread apart as the ring is expanded and binding between the ring and driving lugs is avoided.

The ring 7 is mounted for axial movement on the hub 6 so that the ring may be rigidly supported against contraction by the conical face 9 of the hub when the hub member is pressed toward the clutch element 4. Pressure on the hub member 6 tends to force the conical portion 9 thereof further into the ring and exerts an outward radial pressure on the ring which tends to expand the ring to a larger diameter and thereby provides a relatively rigid support for the ring while the clutch members are in driving engagement. The ring 7 may be normally held against the conical portion 9 of the hub member by means of a spring 14 which is interposed between an internal shoulder on the ring and a retaining plate 15 attached to the inner end of the hub member 6. When the hub member 6 is moved toward the clutch element 4 the friction band 8 on the exterior of the ring 7 is brought into engagement with the internal conical surface 5 impeding further axial movement, whereupon the conical portion 9 of the hub member 6 will effectively support the ring 7 against contraction and also apply direct radial thrust against the internal engaging face 5 of the clutch element 4.

When the hub member 6 is moved in the opposite direction, the conical portion 9 moves outwardly within the internal conical face 10 of the ring thereby removing the radial support for the ring and permitting the ring to contract somewhat due to its resiliency, thereby relieving it from engagement with the clutch element 4. The relatively great angular taper of the conical supporting face 9 of the hub member 6 permits withdrawal of the hub member by a minimum force and insures against sticking of the clutch elements.

Since the engaging face of the ring 7 is held in driving contact with the interior of the clutch element 4 largely by the radial support provided by the engagement of the conical faces 9 and 10 of the hub and ring, the taper of the clutch faces in driving engagement may be made considerably less than would otherwise be permissible without danger of excessive resistance to withdrawal of the movable clutch element. Furthermore, the relatively small angle of taper of the internal and external engaging faces of the clutch elements enables the clutch elements to be held in tight driving engagement by a relatively light axial pressure applied to the movable clutch element. The relatively great angle of taper of the supporting face 9 of the hub member permits the release of the hub from the engaging ring with minimum of resistance and permits the ring to contract slightly because it is no longer supported internally whereby the engaging ring is readily freed from clutch element 4 upon outward movement of the hub member and very little force is required to disengage the clutch elements.

In the electric motor installation herein illustrated the movable clutch element is normally held in engaging position by means of a spring 16 mounted on the shaft 2 and interposed between the outer face of the hub member 6 and a collar 17 keyed to the shaft 2.

By reason of the fact that the supporting conical surface 9 has a greater angle of taper than the internal conical surface 5, the compression of the wedge shaped ring 7 between the conical surfaces 5 and 9 due to the thrust of the spring 16 has a component tending to cause the ring to move forwardly on its conical supporting surface. The contractile thrust of the ring 7 itself due to its resilience also has a component tending to move the ring forwardly on the surface 9. The spring 14 must, therefore, be sufficiently stiff to resist these axial thrusts and prevent the ring 7 from creeping forwardly with respect to the clutch element 6 during operation. Since the spring 16 applies the force which compresses the wedge shaped ring 7 between the surfaces 5 and 9 and which expands the ring 7, it will be apparent that the strength of the spring 14 need not be as great as the spring 16 but should be greater than the components of the applied thrust tending to cause the ring 7 to slide forwardly on the conical surface 9.

As herein shown, the clutch is provided with an electro-magnetic actuating means for moving the hub member 6 outwardly in opposition to the spring 16, the hub having attached thereto an annular armature ring 18 carried by radially projecting arms 19 and positioned in registry with an annular recess 20 formed in the housing wall, an electro-magnet 21 being mounted in the bottom of the recess 20 which when energized draws the armature 18 into the recess. The electro-magnet or other clutch releasing means must be capable of exerting a pull on the hub member 6 sufficient to compress the spring 16 and to overcome any frictional resistance to relative axial movement between the inter-engaging conical faces of the clutch elements. By reason of the small angle of taper of the inter-engaging surfaces of the clutch elements very little axial pressure is required to maintain driving engagement and the spring 16 may be a relatively light spring. By reason of the larger angle of taper of the conical surfaces 9 and 10 of the hub member and ring, frictional resistance to outward axial movement of the hub member relatively to the ring is very slight, and since relative axial movement of the ring and hub member relieves the radial thrust upon the ring to permit the ring to contract to a smaller diameter, there will be very little frictional resistance to withdrawal of the ring from the interior of the clutch element 4 and the electro-magnet 21, which is required to exert only a light pull, may be operated with a relatively small current or may have relatively few turns.

Figures 7, 8:
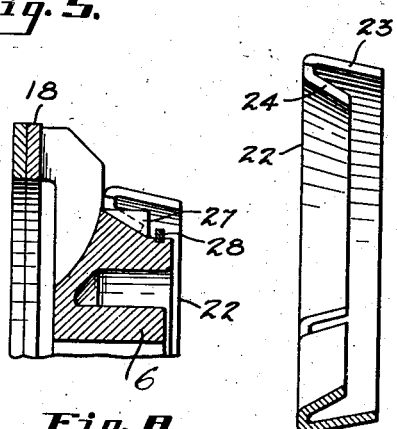
Fig. 7 is a section taken on the line indicated at 7—7 in Fig. 6.
Fig. 8 is a fragmentary section through a slightly modified hub member with the engaging ring shown in Figs. 6 and 7 mounted thereon.
Figure 9:
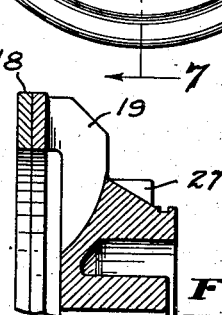
Fig. 9 is a sectional view of the hub member with the engaging and retaining rings removed.

If desired, the engaging ring may be formed of sheet metal as shown in Fig. 7, in which there is shown a split ring 22 formed of a single piece of sheet metal and having an outer flange 23 of conical form tapering at a small angle to correspond to the internal conical surface 5 of the clutch element 4, and an inner flange 24 also of conical form tapering at the same angle as the conical face 9 of hub member 6. The ring 22 is provided with lug receiving slots, one slot 25 being at the transverse slit and other slots 26 being on the opposite side of the ring. In this modification the driving lugs may project into the space between the flanges 23 and 24 and may be of any convenient form. As shown in Fig. 8, the hub member 6 may be provided with driving lugs 27 having exterior edges parallel with the axis of the hub and end edges perpendicular to the axis of the hub, or of any other convenient form provided that the lugs do not project far enough to engage the outer flange 23 of the ring. As shown in Fig. 8, the engaging ring 22 is retained on the hub member by means of a contractile split ring 28 mounted in a peripheral groove near the inner end of the hub and is free to float between the ring 28 and the radial arms 19.

Figure 10:
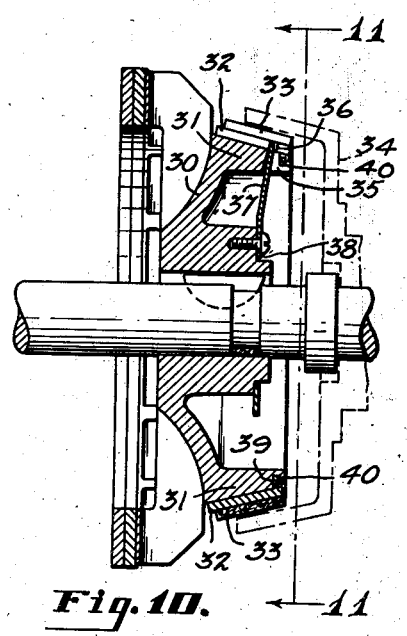
Fig. 10 shows a modified form of clutch in axial section.
Figure 11:
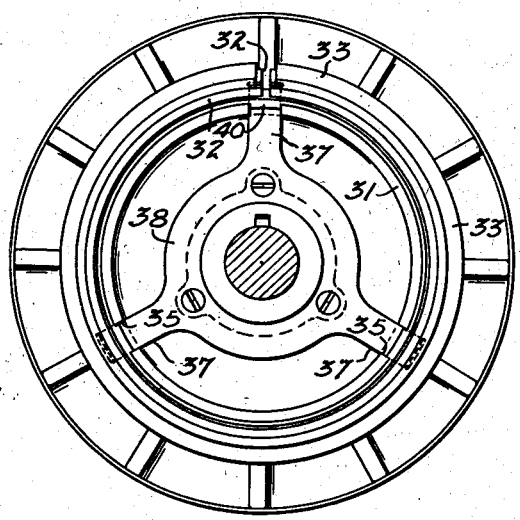
Fig. 11 is a section taken on the line indicated at 11—11 in Fig. 10.

In Figs. 10 and 11 of the drawings there is shown a modification of the invention in which there is provided a sliding clutch element 30 which has a peripheral flange 31 provided with a conical outer face upon which is mounted a correspondingly tapered metal band 32 which fits snugly upon the conical outer face of the flange 31 and which is transversely split to permit it to expand and contract as it slides on the flange 31. The band 32 is a flat conical band provided with a suitable clutch facing 33 for engagement with an internally conical clutch element 34.

The flange 31 is provided at its edge with circumferentially spaced notches 35 and the band 32 is provided at its inner edge with correspondingly spaced apertures or notches 36. Spring arms 37 extending radially from a sheet metal disc 38 rigidly secured to the hub of the clutch element 30, extend through the notches 35 of the flange 31 into the notches or apertures 36 of the expansible band 32, being of a width to slidably fit between the side walls of the notches 35. The spring arms 37 normally press the expansible band 32 toward the large end of the conical flange 31 and serve to normally hold the band into snug engagement with the flange. The spring arms 37 also provide driving lugs for the band 32, the arms 37 providing rigid lugs by reason of their fit in the notches 35. When the clutch element 30 is forced into engagement with the clutch element 34 frictional engagement of the facing 33 with the interior of the clutch element 34 causes the band 32 to ride up the incline of the flange 31 and this movement automatically expands the band to a larger diameter. Upon reverse movement of the clutch element 30 the facing 33 is frictionally held in the clutch element 34 while the flange 31 slides outwardly within the band 32 allowing the resilient contractile band to contract to a smaller diameter and free itself from the clutch element 34, there being sufficient play between the outer ends of the arms 37 and the notches 36 in the band 32, to permit expansion and contraction of the band. The flange 31 and band 32 are preferably provided with three notches equally spaced circumferentially, one of the notches of the band being at the transverse split so that the band 32 is free to expand and contract.

In order to retain the band 32 on the flange 31 and to prevent the band from being forced outwardly past the spring arms 37, the flange 31 is provided adjacent its edge with a relatively deep circumferential groove 39 in which is mounted a resilient contractile split stop ring 40 which is of a radial thickness less than the depth of the groove and does not interfere with the sliding of the band 32 on the flange 31. The ring 40 extends across the outer end of the notches 35 outwardly of the arms 37 of the flange and limits the outward movement of the arms 37 in the notches.

Since there is metal to metal contact between the band 32 and the conical exterior surface of the flange 31, the band will slide more readily with respect to the inner hub member than with respect to the clutch element 34 which is engaged by the friction facing 33. The clutch element 30 may thus be moved outwardly with respect to the band 32 to the extent permitted by the spring arms 37, and stop ring 40, before any movement is imparted to the band 32. The outward movement of the clutch element 30 permits the band 32 to contract and relieve the pressure between the facing 33 and the interior of the clutch element 34, so that continued outward pull will readily free the band from the interior of the clutch element 34.

Figure 12:
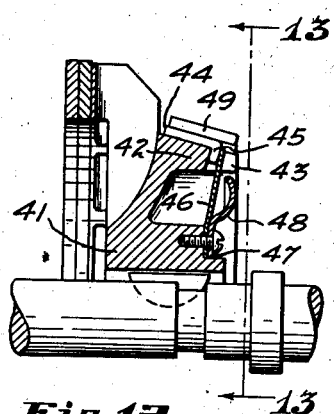
Fig. 12 is an axial section showing a further modification of the expansible clutch element.
Figure 13:
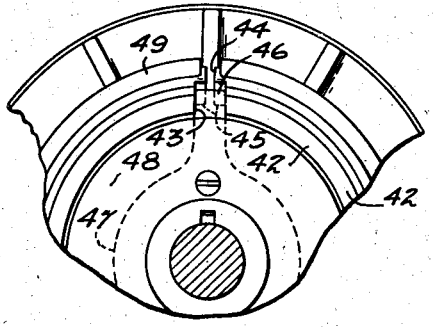
Fig. 13 is a section taken on the line indicated at 13—13 in Fig. 12.

In Figs. 12 and 13, a slightly different construction is shown. In this modification the splined clutch element 41 is provided with a conical flange 42 which has circumferentially spaced notches 43 in the edge thereof. Mounted on the conical flange 42 there is a resiliently contractile transversely split clutch band 44 formed of resilient sheet metal which has a taper corresponding to the flange so that it lies flat upon the flange. The split ring 44 is provided at its inner edge with downturned tongues 45 which engage in the notches 43 and provide driving lugs holding the band against circumferential movement on the flange 42. The tongues 45 are engaged by spring arms 46 which radiate from a sheet metal disc 47 fixed to the hub of the clutch element and which press the band toward the larger end of the conical face of the flange 42. Outward movement of the spring arms 46 is limited by means of a stop disc 48 secured to the hub over the disc 47 and having its peripheral edge just within the edge of the flange 42 to provide a stop for the arms 46. The band 44 is provided with a suitable facing 49 for engagement with the interior of the conical clutch element, the operation in this case being substantially the same as that of the clutch shown in Figs. 10 and 11.

It will be apparent that the present invention provides a very simple, compact and economical clutch which requires only a light engaging spring and which requires but little force to disengage it, and that due to the effective wedging action of the small tapered inter-engaging surfaces, a very effective driving action is obtained and that when applied to an electric motor, both the clutch elements and the clutch actuating devices may be very light and of inexpensive construction.

Furthermore, it is to be understood that the particular form of clutch shown and described, and the particular procedure set forth, are presented for purposes of explanation and illustration and that various modifications of said clutch and procedure can be made without departing from my invention as defined in the appended claims.

What I claim is:

1. A friction clutch having a clutch element provided with a conical internal engaging surface, and a second clutch element having a hub member mounted for movement axially toward and from the first clutch element, said hub member having a conical portion tapering in the same direction as said internal engaging surface but at a greater angle and having circumferentially spaced radial integral projections, said second clutch member having a resilient transversely split ring slidably mounted on the conical portion of the hub member, said ring having axially extending recesses on the inner face thereof to receive said projections, one of said recesses being at the split, said ring having an external conical surface tapered to conform to the taper of said internal engaging surface and an internal conical surface tapered to conform to the conical portion of the hub member and a spring disposed concentric of the hub for restraining separation of the ring and hub at their conforming surfaces.

2. A friction clutch having a clutch element provided with a conical internal engaging surface, a second clutch element having a hub member mounted for movement axially toward and from the first clutch element, said hub member having a conical portion tapering in the same direction as said internal engaging surface but at a greater angle and having a radial projection, said second clutch element having a resilient split ring mounted for axial movements on the hub member, said ring having an external conical surface tapered to conform to said internal engaging surface, an internal conical surface tapered to conform to the conical portion of the hub member and a recess to receive said radial projection, and a spring mounted on said hub member, said spring having one end seated on the hub and its opposite end bearing against said ring and acting to yieldingly press the ring toward the conical portion of the hub member.

3. A friction clutch comprising a clutch element having an internal conical engaging surface which tapers at a relatively small angle, a hub mounted coaxially with said clutch element for rotation relative thereto and for axial movements with respect thereto, said hub having a conical end portion tapering in the direction of said engaging surface but at a greater angle, a resilient expansible ring mounted on the hub for rotation therewith and for axial movement thereon, said ring having an external engaging surface tapered to conform to said internal engaging surface and an internal surface engaging the conical hub surface, means coupling the ring and hub in relative non-rotating engagement, and a spring acting on said hub member and engaging the ring to press the ring into engaging relation with the hub conical surface.

4. A friction clutch having two relatively rotatable clutch elements mounted coaxially for relative axial movement into and out of clutching engagement, one of said elements having a conical internal engaging surface, the other of said elements having a correspondingly tapered surface and circumferentially spaced notches in an end thereof, a resiliently contractile sheet metal band fitting on said tapered surface and having notches registering with notches of the tapered clutch element, and radially disposed spring arms fixed to the tapered clutch element and extending through the notches thereof into the notches of the band.

5. A friction clutch having two relatively rotatable clutch elements mounted coaxially for relative axial movement into and out of clutching engagement, one of said elements having a conical internal engaging surface, the other of said elements having a correspondingly tapered surface and circumferentially spaced notches in an end thereof, a resiliently contractile sheet metal band fitting on said tapered surface and having lugs engaging in said notches, and means for yieldably pressing said band toward the larger end of said tapered surface.

FREDERICK S. KINGSTON.